A. W. Woodward,
Governor.
No. 103,813. Patented May 31, 1870.

Witnesses:
F. H. Pium
E. A. Clarkson

A. W. Woodward, Inventor
by H. W. Beadle
his Attorney

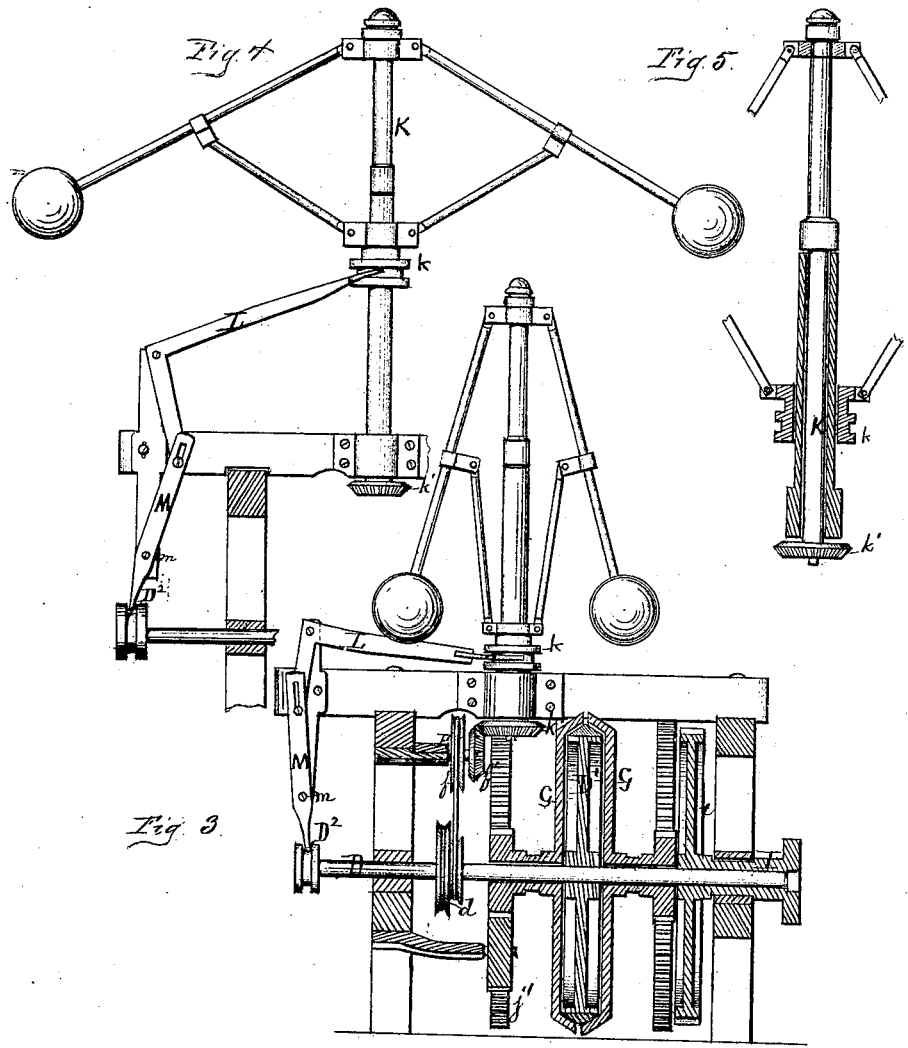

UNITED STATES PATENT OFFICE.

AMOS W. WOODWARD, OF ROCKFORD, ILLINOIS.

IMPROVEMENT IN WATER-GOVERNORS.

Specification forming part of Letters Patent No. 103,813, dated May 31, 1870.

*To all whom it may concern:*

Be it known that I, AMOS W. WOODWARD, of Rockford, in the county Winnebago and State of Illinois, have invented a new and useful Improvement in Water-Wheel Governors; and I do hereby declare that the following is a full and exact description of the same, reference being had to the accompanying drawings, and to the letters of reference marked thereon.

This invention has for its object the production of a water-wheel governor which shall be capable of quickly changing the position of the gate as greater or lesser power is used, and yet have but few parts which are compelled to move continuously; and it consists, first, in the employment of a disk fixed upon a sliding shaft, in connection with friction-pulleys loose upon such shaft, to which latter pinions are attached for the purpose of operating the gearing for moving the gate; secondly, in the specific construction of the disk and pulleys; thirdly, in the combination of the governor-sleeve, compound adjustable lever, and sliding shaft; fourthly, in the combination and arrangement of the governor as a whole.

Figure 1:
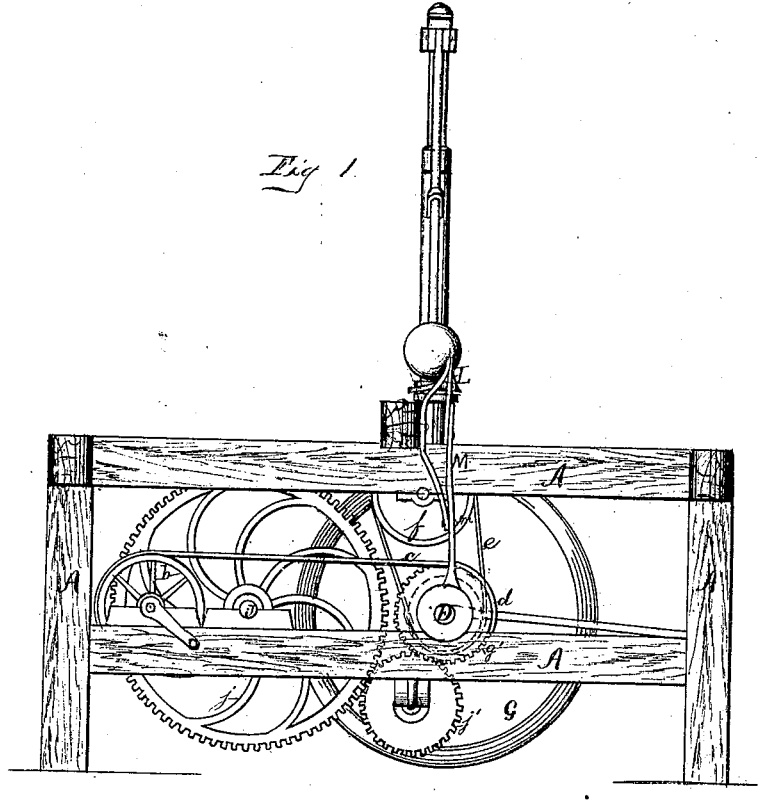
Figure 2:
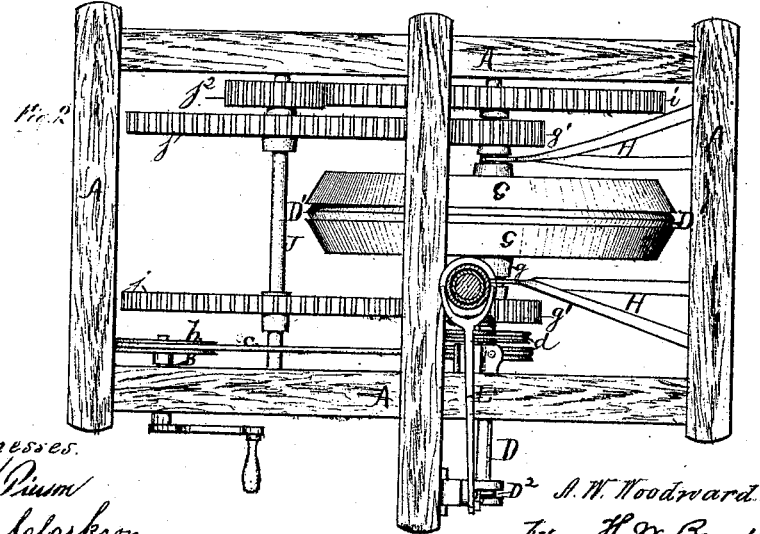

In the drawings, Figure 1 represents a side elevation; Fig. 2, a plan view with the governor-shaft cut away; Fig. 3, a partial transverse sectional elevation, and Figs. 4 and 5 views of parts detached.

To enable others skilled in the art to make and use my invention, I will now proceed to describe fully its construction and operation.

A A represent a frame-work, of any proper form and suitable construction.

B represents a shaft resting in suitable bearings in the frame, which is provided with the pulley $b$, upon which runs the belt $c$. The shaft B receives power in any suitable manner from the main driving-shaft.

D also represents a shaft, which extends entirely across the frame, and is so held by proper bearings upon each side as to be permitted to move slightly longitudinally when desired. To this shaft is rigidly fixed the double grooved pulley D, upon which run the belts $c$ and $e$, the latter of which also passes over the pulley $f$ on the shaft F. To the shaft D is also rigidly attached the disk D', Fig. 2, which may be of any proper form and suitable construction, but is preferably made with inclined edges, as shown in the drawings. Upon the shaft is also located, upon each side of the disk D', a friction-pulley, G, which corresponds in shape with the disk, and has attached to it a sleeve and pinion, $g$ $g'$. These pulleys are held in place and kept from moving longitudinally by means of the braces H, the fingers of which rest in grooves of the sleeves, as shown, in such manner as not to interfere with their free revolution upon the shaft. Upon one end of the shaft D is also placed a sleeve, I, Fig. 3, which rests in bearings in the frame, as shown, and supports the end of the shaft D, which passes through it. This sleeve is provided upon its inner end with a gear-wheel, $i$, and upon its outer end with a coupling, to which may be attached any proper connection for operating the water-gate. The pinions $g'$ of the pulleys G engage with gear-wheels $j$ $j$, Fig. 2, upon the shaft J, in one case directly and in the other through an intermediate gear-wheel, $j'$, and from the shaft J the power is communicated to the gear-wheel $i$ by means of a pinion, $j^2$, as shown in the drawings.

$f'$ represents a bevel-gear wheel upon the shaft F, which engages with a like wheel, $k'$, upon the lower end of the shaft K. This shaft revolves in suitable bearings, and is provided with arms and balls, which may be arranged in any suitable manner. To its sleeve $k$ is attached the crank-lever L by means of fingers in the usual manner.

M also represents a lever, having its fulcrum at the point $m$, the short arm of which rests in the grooved collar $D^2$ of the shaft D, as shown. Its long arm is slotted and connected to the lever L by means of a set-screw, as shown. By means of this construction the relative position of the levers may be readily adjusted at will.

The operation is as follows: Power is applied in any suitable manner to the shaft B, from which it is communicated by means of the belt $c$ to the pulley $d$ upon shaft D, which is revolved thereby, and from the pulley $d$ to the pulley $f$ by means of the belt $e$. The pulley $f$ revolves the shaft F, and thus communicates motion through the gearing $f'$ $k'$ to the governor-shaft K. It will be perceived, therefore, that the only parts of the governor which receive direct and continuous motion are the governor-shaft K and its connections and the shafts B and D.

The adjustment of the gate to regulate the supply of water is accomplished as follows: If much power is being used and the gate is down, and therefore needs to be raised, the governor-balls, on account of their slow revolution, will fall, and, thus depressing the sleeve $k$, will move the shaft D to one side by means of the compound lever L M. This movement of the shaft brings the disk D' in contact with one of the pulleys G, and causes it to revolve with it. Motion is thus communicated by means of the pinions upon the sleeve of the pulley to one of the gear-wheels $j$ upon the shaft J, and through the pinion $j^2$ of the latter to the gear-wheel $i$ upon the coupling-sleeve I. The revolution of the latter through its connections causes the water-gate to rise and admit a greater volume of water. This revolution continues until a sufficient quantity of water is admitted to give such speed to the governor as will enable it to throw out its balls, and thus move the shaft D through the connections described, and withdraw the disk D' from contact with friction-pulley G. If too much water be admitted, the shaft will be drawn far enough back to bring the disk D' into contact with the other friction-pulley G, and a like result follows, excepting that from the arrangement of the gearing the coupling-sleeve is necessarily revolved in an opposite direction.

From this description it will be readily perceived that the construction and arrangement of parts herein described possess certain marked advantages; but few of the parts are compelled to move continuously, and hence much wear incidental to other constructions is saved. The governor may be adjusted by moving the friction-pulleys upon the shaft, so that it may be exceedingly sensitive to any change of power and quickly adjust the gate to correspond thereto.

The peculiar form of the disk and pulleys is desirable, as a large bearing-surface is obtained, and there is therefore little chance for slipping of the parts. Other forms, however, may be used without departing from the spirit of my invention.

The arrangement of the gearing is such as to give great power with comparatively slow motion as a resultant of the operation—a movement especially desirable for this kind of work. The governor, as a whole, is simple in all its parts, and therefore not liable to get out of order, and it is also exceedingly effective in operation.

Having thus fully described my invention, what I claim as new, and desire to secure by Letters Patent, is—

1. A disk, D', fixed upon a sliding shaft, as arranged in relation to friction-pulleys G, loose upon said shaft, and with pinions $g'$, operating the gate, substantially as described, for the purpose set forth.

2. The disk D', provided with inclined edges, as shown, in combination with the friction-pulleys G, of shape shown, for the purpose set forth.

3. The compound adjustable lever L M, when combined with the governor-sleeve $k$ and shaft D, as described, for the purpose set forth.

4. The governor described, consisting, essentially, of the sliding shaft D, with disk D', friction-pulleys G G, pinions $g'g'$, shaft J, with gear-wheels $j\ j$, gear-wheels $j'\ j^2$, coupling-sleeve I, with gear-wheel $i$, braces H, governor-shaft K, with its connections, and compound adjustable lever L M, when combined as described, for the purpose set forth.

This specification signed and witnessed this 20th day of January, 1870.

AMOS W. WOODWARD.

Witnesses:
G. W. FORD,
F. L. BLACKMAN.